Patented Jan. 31, 1939

2,145,800

UNITED STATES PATENT OFFICE 2,145,800

CINCHONA SULPHANILAMIDE AND PROCESS OF MAKING IT

Elmer H. Stuart, Indianapolis, Ind., assignor to Eli Lilly and Company, Indianapolis, Ind., a corporation of Indiana No Drawing. Application January 20, 1938, Serial No. 185,925

10 Claims. (Cl. 260—284)

It is the object of my invention to produce salts which contain sulphanilamide and a cinchona alkaloid in molecular proportions.

By the term "cinchona alkaloid" in this specification I mean an alkaloid of the class consisting of quinine, quinidine, euquinine, cinchonine, and cinchonidine; which the U. S. Pharmacopoeia XI and the National Formulary No. VI show to be the cinchona-derived alkaloids of practical importance. There are a great number of other alkaloids derived from cinchona; but my present invention is not concerned with them. Of the cinchona alkaloids of my present invention, I now consider quinine and quinidine as probably the most important, in the order named.

The cinchona alkaloids, especially quinine and its salts, are well known for their therapeutic action in certain diseases. Sulphanilamide, which is p-amino-benzene-sulphonamide, has also proven its efficacy as a therapeutic agent.

A composite therapeutic product containing both quinine and sulphanilamide has been disclosed by Horace M. Powell, as set forth in his application Serial No. 179,374, filed December 11, 1937.

I have discovered that homogeneous crystalline salts which contain a cinchona alkaloid and sulphanilamide in molecular proportions may be made, and that those homogeneous crystalline salts have physical and chemical properties which seem to indicate that they are compounds. For instance, they form definite crystals; those crystals have definite melting points; the sulphanilamide component is not separated from the cinchona-alkaloid component of these crystals by extraction with acetone, as it is in the case of mere mixtures of sulphanilamide and (for instance) quinine salts because of the ready solubility of sulphanilamide in acetone; the cinchona-alkaloid component is not separated from the sulphanilamide component of these crystals by extraction with alcohol, as it is in the case of mere mixtures of a quinine salt and sulphanilamide because of the ready solubility of the quinine salt in alcohol; the crystals are usually yellow or at least yellowish in color, whereas both the sulphanilamide and ordinary cinchona-alkaloid salts are white in color; the crystals are homogeneously soluble in various solvents, and usually have a solubility which is different both from the solubility of the sulphanilamide and from the solubility of the cinchona-alkaloid salts.

In order to make a salt of sulphanilamide and a cinchona alkaloid, it is necessary that there be a sufficient amount of a strong mineral acid present, of the class consisting of the halogen acids and sulphuric acid, to satisfy the acid-combining power of the cinchona-alkaloid component. That is, assuming that hydrochloric acid (a monobasic acid) is the acid, there must be at least two molecules of hydrochloric acid for each molecule of the cinchona-alkaloid component. Similarly, assuming that sulphuric acid (a dibasic acid) is the acid, there must be at least one molecule of sulphuric acid for each molecule of the cinchona-alkaloid component. More acid than the amount named may be present in the reaction, and in the case of quinine and quinidine but apparently not in the case of cinchonine and cinchonidine the crystals which are obtained may contain in addition to the minimum amount of acid specified above as much as 50% more of the acid, apparently to satisfy the acid-combining power of the sulphanilamide component.

In carrying out my invention, I put together both a cinchona alkaloid or a salt of it (such as the hydrochloride or the dihydrochloride or the hydrobromide or the hydriodie or the sulphate or the bisulphate) and sulphanilamide, in a suitable solvent, most conveniently water, with at least enough added acid if any is necessary to provide the total amount of acid specified above. If necessary, warming is resorted to to promote dissolving. When dissolving is complete, I cool the solution to the temperature necessary to produce crystallization, and recover the crystals formed, as by filtration. Desirably the crystals are washed, as with water or dilute acid, and if desired may be subjected to a second crystallization process, as from water or from alcohol, to obtain greater purification.

The following are examples of my process:

*Example 1.*—Into 30 cc. of distilled water I put 30 grams of quinine dihydrochloride and 12.9 grams of sulphanilamide. These amounts of quinine dihydrochloride and sulphanilamide are in substantially molecular proportions with respect to each other; and the quinine dihydrochloride has enough hydrochloric acid combined with the quinine to satisfy the acid-combining power of the quinine. The whole is well mixed, then warmed until complete solution occurs to yield a clear liquid. Thereupon the whole is put into a refrigerator which will reduce the temperature to below zero centigrade, and left for several hours, or overnight. On this cooling, a mass of yellow crystals is formed, leaving a relatively small amount of mother liquid because the crystals obtained are separated from the mother liquor, as by filtration, conveniently while still in the refrigerator; and are desirably washed with a small amount of water. When these crystals, which contain water of crystallization, are removed from the refrigerator and warmed, to room temperature or above, they liquefy. If the liquid thus obtained is then subjected to vacuum distillation at relatively low temperature, say about 40° C., a dry solid residue is obtained containing less water of crystallization, probably only one molecule; while if such liquid is subjected to vacuum distillation at a higher temperature, say about 75° C., a dry solid residue is obtained which is apparently free from water of crystallization. This anhidrous salt may also be obtained directly if absolute alcohol is used as the initial liquid instead of water.

The solid residue obtained, whether with or without some water of crystallization, may readily be ground into a powder if it is not already sufficiently finely divided; and that powder is bright yellow in color whether or not there is water of crystallization present. Analysis shows that the solid residue obtained contains one molecule of quinine, one molecule of sulphanilamide, and two molecules of hydrochloric acid. The amorphous product, if carefully dried, has a definite melting point of about 130° C., corrected; and has a specific optical rotation, as observed in a 2.5% solution, of $$[\alpha]_D^{25°} = -155°$$

The product containing one molecule of water of crystallization has a definite melting point of about 110° C., corrected; and has a specific optical rotation, as observed in a 2.5% solution, of $$[\alpha]_D^{25°} = -150°$$

*Example 2.*—This is the same as Example 1, save that 30 cc. of 10% hydrochloric acid is used initially instead of 30 cc. of water. That is, enough additional hydrochloric acid is added beyond that contained in the quinine dihydrochloride to satisfy the acid-combining power of the sulphanilamide. The crystals and final powder which are obtained are both a much lighter yellow than those obtained in Example 1, although they are still at least yellowish. Analysis shows that these crystals of Example 2 contain one molecule of quinine, one molecule of sulphanilamide, and three molecules of hydrochloric acid. The product shrinks at about 130° C., and melts completely at about 150° C., corrected. Its specific optical rotation, as observed in a 2.5% solution, is $$[\alpha]_D^{25°} = -144°$$

*Example 3.*—Instead of using the quinine dihydrochloride of Examples 1 and 2, I may use quinone monohydrochloride, or even quinine in the alkaloid form, if I use enough additional hydrochloric acid to make up the necessary amount.

*Example 4.*—Into 30 cc. of distilled water I put 4.2 grams of quinine bisulphate and 1.7 grams of suphanilamide. The whole is well mixed, and heated to boiling; by which time all the added solid material is dissolved. On cooling to room temperature, crystals are formed; and these are suitably removed, as by filtration. They are desirably subjected to recrystallization, by dissolving them in about 30 cc. of boiling water and then permitting the solution to cool. The recrystallized product is separated by filtration. Analysis shows that these crystals, which are white, contain quinine and sulphanilamide in substantially molecular proportions, associated with one molecule of sulphuric acid (a dibasic acid). The crystals thus obtained melt at about 208° C., corrected, and in a 2.5% solution the specific optical rotation is $$[\alpha]_D^{25°} = -147°$$

*Example 5.*—This is the same as Example 4, save that instead of using 30 cc. of water at the outset I use 5 cc. of water into which has been put 0.5 cc. of concentrated sulphuric acid, and instead of recrystallizing from 30 cc. of water I recrystallize from about 5 cc. of water. The final crystals obtained, like those of Example 4, are white. Analysis shows that those crystals contain quinine and sulphanilamide in substantially molecular proportions, associated with one and one-half molecules of sulphuric acid. The product has a melting point of about 186° C., corrected; and a specific optical rotation, as observed in a 2.5% solution, of $$[\alpha]_D^{25°} = -112°$$

*Example 6.*—This is the same as Example 4, save that instead of using 30 cc. of water I use 30 cc. of 95% ethyl alcohol as the solvent. The crystals obtained are the same as those of Example 4.

*Example 7.*—Instead of using quinine as the cinchona alkaloid, I may use quinidine or euquinine or cinchonine or cinchonidine in any of the foregoing examples, with proper compensation for any change in molecular weight; although when cinchonine or cinchonidine is used the final product obtained contains to one molecule of sulphanilamide and one molecule of the cinchona alkaloid only two molecules of hydrochloric acid or one molecule of sulphuric acid even though a greater amount of acid was present in the course of the reaction. In addition, with any of the cinchona alkaloids, I may use any of the other halogen acids in place of hydrochloric acid, both in combination with the cinchona alkaloid in the original salt used and as any added acid that is used; but if any added halogen acid is used I deem it best that it be the same halogen acid that is already combined with the cinchona alkaloid in the initial salt. The following table shows some of the salts which are thus obtainable, together with their melting points and optical rotations:

| Compound | Approximate melting point | $[\alpha]_D^{25°}$ | Color |
|---|---|---|---|
| | Degrees | Degrees | |
| Quinine-sulphanilamide-2HBr | 210 | −126 | Light yellow. |
| Quinine-sulphanilamide-2HI | 70 | −92.5 | Yellow. |
| Quinidine-sulphanilamide-H₂SO₄ | 172 | +164 | Light Cream. |
| Quinidine-sulphanilamide-2HCl | 135 | +170 | Yellow. |
| Quinidine-sulphanilamide-2HBr | 130 | +137.5 | Do. |
| Euquinine-sulphanilamide-H₂SO₄ | 91 | −51.5 | Do. |
| Euquinine-sulphanilamide-2HCl | 135 | −55 | Do. |
| Euquinine-sulphanilamide-2HBr | 135 | −43.1 | Do. |
| Cinchonine-sulphanilamide-H₂SO₄ | 120 | +123.5 | Do. |
| Cinchonine-sulphanilamide-2HCl | 135 | +132 | Do. |
| Cinchonine-sulphanilamide-2HBr | 130 | +112 | Do. |
| Cinchonidine-sulphanilamide-H₂SO₄ | 180 | −92.5 | Cream. |
| Cinchonidine-sulphanilamide-2HCl | 136 | −93.7 | Yellow. |
| Cinchonidine-sulphanilamide-2HBr | 136 | −78 | Do. |

*Example 8.*—In the preceding examples I have contemplated using as the initial sulphanilamide compound the uncombined form of sulphanilamide. However, I may use instead a salt of sulphanilamide with a halogen acid or with sulphuric acid; in which case the acid is desirably the same in all the reactants used, and the amount of acid in the cinchona-alkaloid salt used and/or the amount of additional acid may be reduced. However, in all the examples it is possible to have a slight excess of acid over what is necessary for the formation of the crystals; but I prefer that any such excess should be relatively slight.

The foregoing examples are merely by way of illustration, and not by way of limitation.

I claim as my invention:

1. A salt, in solid form, of sulphanilamide and a cinchona alkaloid, of an acid of the class consisting of the halogen acids and sulphuric acid.

2. A salt, in solid form, of sulphanilamide and a cinchona alkaloid as set forth in claim 1, in which there is a sufficient amount of the acid present to satisfy the acid-combining power of the cinchona-alkaloid component.

3. A hydrochloric-acid salt, in solid form, or sulphanilamide and a cinchona alkaloid.

4. A sulphuric-acid salt, in solid form, of sulphanilamide and a cinchona alkaloid.

5. A quinine-sulphanilamide salt, in solid form, of an acid of the class consisting of the halogen acids and sulphuric acid.

6. A quinine-sulphanilamide salt, in solid form, as set forth in claim 5, in which there is a sufficient amount of the acid present to satisfy the acid-combining power of the quinine component.

7. A hydrochloric-acid salt, in solid form, of sulphanilamide and quinine.

8. A sulphuric-acid salt, in solid form, of sulphanilamide and quinine.

9. The process of making a salt, in solid form, of sulphanilamide and a cinchona alkaloid, which consists in putting both sulphanilamide and the cinchona alkaloid in a solvent to form a solution in which there is a sufficient amount present of a mineral acid of the class consisting of the halogen acids and sulphuric acid to satisfy the acid-combining power of the cinchona alkaloid, reducing the temperature of the solution to produce crystals, and separating those crystals.

10. The process of making a salt, in solid form, of quinine and sulphanilamide, which consists in putting both sulphanilamide and quinine in a solvent to form a solution in which there is a sufficient amount present of a mineral acid of the class consisting of the halogen acids and sulphuric acid to satisfy the acid-combining power of the quinine, reducing the temperature of the solution to produce crystals, and separating those crystals.

ELMER H. STUART.

CERTIFICATE OF CORRECTION.

Patent No. 2,145,800.   January 31, 1939.

ELMER H. STUART.

It is hereby certified that error appears in the above numbered patent requiring correction as follows: In the grant, lines 2 and 14, the name of the assignee was erroneously written as "Eli Lily and Company" whereas said name should have been written as Eli Lilly and Company, as shown by the record of assignments in this office; page 1, second column, line 19, for "hydriodie" read hydriodide; line 49, for the word "liquid" read liquor; line 50, before "obtained" insert the words contain considerable water of crystallization. The crystals thus; page 2, first column, line 48, for "quinone" read quinine; and second column, line 63, in the table, second column thereof, for "210" read 211; last column of same table, for the expression "Do." appearing eight times, read Yellow.; page 3, first column, line 27, claim 3, for "or" read of; and that the said Letters Patent should be read with this correction therein that the same may conform to the record of the case in the Patent Office.

Signed and sealed this 28th day of March, A. D. 1939.

Henry Van Arsdale (Seal)   Acting Commissioner of Patents.

*Example 8.*—In the preceding examples I have contemplated using as the initial sulphanilamide compound the uncombined form of sulphanilamide. However, I may use instead a salt of sulphanilamide with a halogen acid or with sulphuric acid; in which case the acid is desirably the same in all the reactants used, and the amount of acid in the cinchona-alkaloid salt used and/or the amount of additional acid may be reduced. However, in all the examples it is possible to have a slight excess of acid over what is necessary for the formation of the crystals; but I prefer that any such excess should be relatively slight.

The foregoing examples are merely by way of illustration, and not by way of limitation.

I claim as my invention:

1. A salt, in solid form, of sulphanilamide and a cinchona alkaloid, of an acid of the class consisting of the halogen acids and sulphuric acid.

2. A salt, in solid form, of sulphanilamide and a cinchona alkaloid as set forth in claim 1, in which there is a sufficient amount of the acid present to satisfy the acid-combining power of the cinchona-alkaloid component.

3. A hydrochloric-acid salt, in solid form, or sulphanilamide and a cinchona alkaloid.

4. A sulphuric-acid salt, in solid form, of sulphanilamide and a cinchona alkaloid.

5. A quinine-sulphanilamide salt, in solid form, of an acid of the class consisting of the halogen acids and sulphuric acid.

6. A quinine-sulphanilamide salt, in solid form, as set forth in claim 5, in which there is a sufficient amount of the acid present to satisfy the acid-combining power of the quinine component.

7. A hydrochloric-acid salt, in solid form, of sulphanilamide and quinine.

8. A sulphuric-acid salt, in solid form, of sulphanilamide and quinine.

9. The process of making a salt, in solid form, of sulphanilamide and a cinchona alkaloid, which consists in putting both sulphanilamide and the cinchona alkaloid in a solvent to form a solution in which there is a sufficient amount present of a mineral acid of the class consisting of the halogen acids and sulphuric acid to satisfy the acid-combining power of the cinchona alkaloid, reducing the temperature of the solution to produce crystals, and separating those crystals.

10. The process of making a salt, in solid form, of quinine and sulphanilamide, which consists in putting both sulphanilamide and quinine in a solvent to form a solution in which there is a sufficient amount present of a mineral acid of the class consisting of the halogen acids and sulphuric acid to satisfy the acid-combining power of the quinine, reducing the temperature of the solution to produce crystals, and separating those crystals.

ELMER H. STUART.

---

CERTIFICATE OF CORRECTION.

Patent No. 2,145,800.                      January 31, 1939.

ELMER H. STUART.

It is hereby certified that error appears in the above numbered patent requiring correction as follows: In the grant, lines 2 and 14, the name of the assignee was erroneously written as "Eli Lily and Company" whereas said name should have been written as Eli Lilly and Company, as shown by the record of assignments in this office; page 1, second column, line 19, for "hydriodie" read hydriodide; line 49, for the word "liquid" read liquor; line 50, before "obtained" insert the words contain considerable water of crystallization. The crystals thus; page 2, first column, line 48, for "quinone" read quinine; and second column, line 63, in the table, second column thereof, for "210" read 211; last column of same table, for the expression "Do." appearing eight times, read Yellow.; page 3, first column, line 27, claim 3, for "or" read of; and that the said Letters Patent should be read with this correction therein that the same may conform to the record of the case in the Patent Office.

Signed and sealed this 28th day of March, A. D. 1939.

Henry Van Arsdale (Seal)                          Acting Commissioner of Patents.